Feb. 9, 1937.  B. B. RANDRUP  2,069,901
FUEL TANK LOCK
Filed April 27, 1935
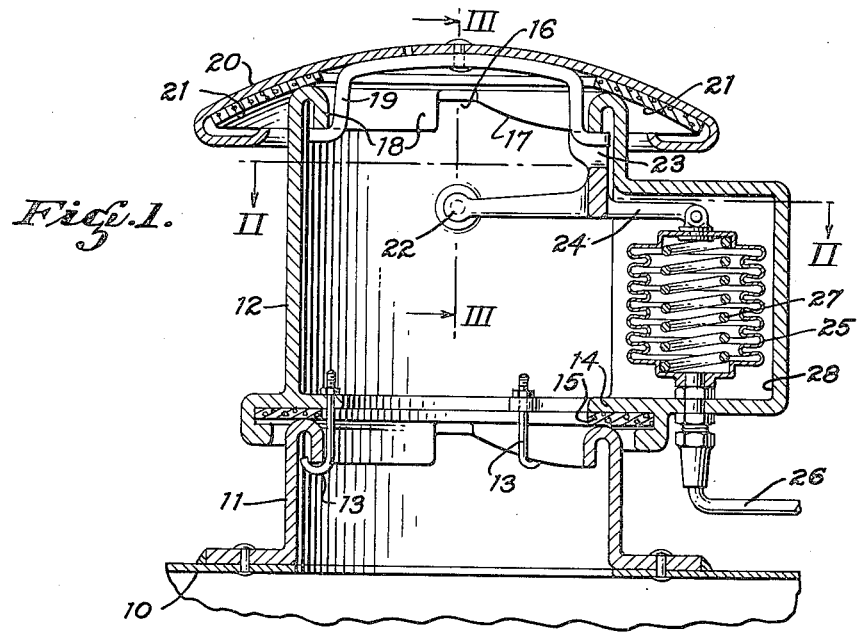
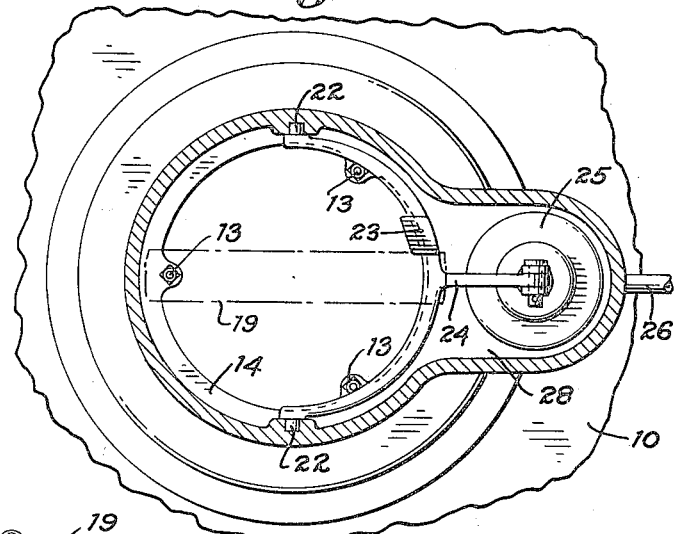
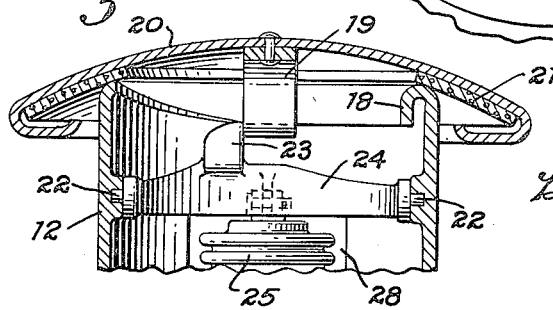
INVENTOR.
Benjamin B. Randrup
BY W. H. Atkinson
ATTORNEY.

Patented Feb. 9, 1937

2,069,901

UNITED STATES PATENT OFFICE 2,069,901

FUEL TANK LOCK

Benjamin B. Randrup, Brisbane, Calif.

Application April 27, 1935, Serial No. 18,585

5 Claims. (Cl. 70—90)

The present invention relates to a pressure responsive locking means for the fuel tank of an automobile and more particularly to an improved device wherein the pressure responsive means comprises a mechanically sealed pressure responsive operating means.

An object of the present invention is to provide a new, novel, practical and inexpensive pressure responsive locking means for the closure member of an automobile fuel tank.

Another object of the invention is to provide in a pressure responsive fuel tank locking system an operating element which is mechanically sealed and therefore impervious to damage or failure in operation due to lack of lubrication and/or the accumulation of foreign matter.

In the prior art there is disclosed a number of devices for securing and releasing the closure means of a fuel tank in response to pressure conditions produced by the operation of an internal combustion engine. In each of these prior art disclosures, however, the mechanism therein employed comprises the use of a movable piston which, as is well known, is difficult to seal properly because of lack of lubrication and/or the dilution of the lubricant by gasoline and/or fumes which necessarily are present in the environment where such devices are required to operate. Because of the above condition, the prior art devices have not met with any commercial success. It is therefore a further object of the present invention to overcome the above difficulty and provide a pressure responsive operating element for systems of this character which will operate successfully without lubrication, and which cannot become contaminated and/or rendered inoperative by the accumulation of foreign matter, such for example as the residue resulting from the evaporation of the so-called "Ethyl" fuel.

In carrying out this invention the locking means is preferably controlled by a bellows of the so-called sylphon type which may in itself have sufficient resilience when expanded to operate the detent in one direction and when collapsed will operate the locking means in a reverse direction. It is also within the scope of this invention to enclose a spring means which will expand the bellows element in the event that the walls thereof do not possess sufficient resilience to operate the locking means, as suggested above.

For a better understanding of the invention reference should be had to the accompanying drawing wherein there is shown, by way of illustration and not of limitation, a preferred embodiment thereof.

In the drawing:

Figure 1 is a vertical, sectional view showing a device embodying the present invention firmly secured upon the filling extension of a fuel tank, Figure 2 is a horizontal, sectional view taken along line II—II of Figure 1, Figure 3 is a partial vertical, sectional view taken along line III—III of Figure 1, looking in direction of arrows, and Figure 4 is a perspective view showing in detail a preferred form of detent member.

In the drawing, the invention is shown as embodied in an extension member which can be attached to the filling neck of a fuel tank. However, it is to be understood that the invention may also be embodied directly upon the neck of a fuel tank and/or mounted thereupon in any convenient and practical manner. The unit illustrated is particularly adapted to be sold as an accessory to be applied to fuel tanks now in existence.

In the drawing, wherein like numerals refer to like parts throughout the several views, the numeral 10 designates the wall of a fuel tank having a filling opening or neck 11 upon which there is adapted to be attached by a bayonet slot arrangement and/or by threaded engagement, a suitable closure member. The neck 11 is shown as having an extension member 12 secured thereto by means of hooked bolts 13. The bottom of the extension member 12 has a flanged portion 14 which is adapted to hold a suitable sealing gasket 15 that rests and seals the extension member 12 upon the end of the neck 11. The upper end of the member 12 is also shown as having bayonet receiving slots 16 from which cam surfaces 17 extend. Two of these slots 16 are provided in oppositely disposed positions upon an inturned flange 18, so that when the oppositely disposed bayonet-like members 19 upon a closure member 20, are passed therethrough and turned, the closure member 20 will be firmly secured upon the extension member 12. The closure member 20 may also, where desired, be provided with a sealing packing 21.

Pivotally mounted within the extension member 12, at oppositely disposed points 22, there is a detent member 23 which, when in its uppermost position, will rest against the inturned flange 18 adjacent a point where one of the bayonet members 19 will stop when the closure member 20 is turned into its final tank closing position. This detent member has an outwardly extending arm 24 which is connected to a collapsible bellows 25 located therebelow. The bellows 25 is shown in the drawing as of the so-called sylphon type and at its top as connected to the arm 24 by means of a suitable pivotal connection. The bottom of the bellows 25 is secured to a wall of the extension member 12 by means of a pipe coupling and extending from this pipe coupling there is a length of tubing 26 which connects the interior of the bellows 25 to the manifold or some other subatmospheric area upon the engine.

It is contemplated that the bellows member 25 may be so constructed as to have sufficient inherent resilience to bias the detent member 23 into an operative position. However, it is also within the scope of this invention, where necessary, to provide a spring means 27 either within or externally of the bellows member 25 for the purpose of returning and holding the detent 23 in an operative position when the engine is idle. The bellows member 25 is shown as disposed externally of the cylindrical wall of the extension member 12 by providing an integrally formed compartment 28 upon one side thereof.

With the above arrangement, it will be readily seen that when the engine is in operation and the bellows 25 is connected to a subatmospheric pressure area upon the engine, the bellows 25 will be collapsed and as a result the detent 23 will be moved downwardly into an inoperative position which will permit a turning of the closure member 20 and its removal from the extension member 12.

In view of the rule now uniformly in force at fueling stations, which requires a stopping of the engine when being supplied with fuel, it may be desirable to extend the tubing 26 up to the dash or the instrument board of the automobile and there provide a valve that can be closed to hold the vacuum and thus retain the bellows in a collapsed position sufficiently long to permit the operator to get out of the automobile and remove the closure member 20 before the detent 23 is returned to its locking position. If no such valve is provided it will be necessary for the fuel station attendant to first rotate the closure member 20 to a released position before the engine is cut off by the driver.

The operation of this invention should be clear from the above description. However, by way of recapitulation it may be said that when the engine is operating a vacuum will be created within the bellows 25 and cause it to collapse and thus withdraw the detent 23 out of locking engagement with the closure member 20. When the engine is idle the vacuum created thereby will be immediately lost and as a result the bellows 25 will expand either as a result of its inherent resilience or as a result of forces exerted by the spring 27 and move the detent 23 into closure locking relation with the flange 19 upon the extension member 12. At this point it should be pointed out that the detent 23 is shown as chamfered on one side so as to permit a rotation of a bayonet member 19 in a closure securing direction. This makes possible the application of the closure member 20 to the fuel tank inlet irrespective of whether or not the engine is operating or idle.

It will be apparent from the above that since the fuel tank closure member 20 will be securely locked against removal at all times when the engine is at rest, the present invention provides a fuel tank closure locking arrangement of high, practical efficiency. In other words, since access to the engine controls is generally difficult without proper keys and due authority, only duly authorized persons can release the tank lock.

While I have, for the sake of clearness and in order to disclose my invention so that the same can be readily undersood, described and illustrated specific devices and arrangements, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is—

1. In a device of the character described, the combination of an internal combustion engine, a fuel tank having a filling neck formed thereupon, an extension forming member having a bellows enclosing compartment adapted to be secured upon said filling neck, a closure member adapted by rotation to be attached and detached upon said extension forming member, a retractable detent pivotally mounted upon said extension forming member engaging said closure member to prevent a detachable rotation thereof and having an operating arm extending into the bellows enclosing compartment, a collapsible bellows mounted at one end in the bellows enclosing compartment on said extension member and connected at its other end to the operating arm of said detent for controlling the operation of said detent, and a sealed connection between the interior of said bellows and the intake manifold of said internal combustion engine.

2. In a pressure responsive locking device for the fuel tank of an internal combustion engine, the combination of a fuel tank inlet extension upon the gas tank, a detachable closure member secured by rotation in interlocking relation over the end of said inlet extension, a detent pivotally mounted upon said inlet extension adapted to permit rotation of said closure member in one direction to secure same upon said extension and prevent rotation in a reverse direction to remove same, spring means for urging said detent into its operative position, and a collapsible walled mechanically sealed member connected with said detent and enclosing said spring means and having its interior communicating with the manifold of a gasoline engine, whereby said detent will be rendered inoperative to secure said closure member against rotation and removal when the engine is running.

3. In a pressure controlled lock for the fuel tank of an internal combustion engine, the combination of a cylindrical extension member secured over the filling opening of a fuel tank having a compartment formed along one side thereof, a closure member adapted to be secured by rotation upon the end of said extension member, a forked lever having its forked end pivoted at diametrically opposite points within said extension member and having an arm extending into the compartment at the side of said extension, a detent carried by said forked lever engaging said closure member and preventing a removal rotation thereof, a spring operating upon said lever for holding said detent in an operative position, and a sealed pressure responsive bellows for moving said detent against the action of said spring and into an inoperative position to permit a removal of said closure member from said extension member, and a connection between the interior of said bellows and a subatmospheric pressure area of the internal combustion engine, whereby a removal of said closure member will be prevented when said engine is stopped.

4. In a pressure responsive locking device for the fuel tank of an internal combustion engine, the combination of an inlet extension upon the fuel tank having a chamber at one side thereof, a detachable closure member secured by rotation over the end of said extension member, a forked lever pivoted at its forked ends along the diametrical center of said extension member and having its free end extending into said chamber, a detent upon said lever adapted to permit rotation of said closure member in applying same upon said extension and to prevent rotation thereof to remove same, a spring operating to hold said lever and detent in an operative position, and a collapsible walled mechanically sealed member located in said chamber operable to overcome the action of said spring having its interior communicating with the intake manifold of an internal combustion engine, whereby said detent will be rendered inoperative to secure said closure member against rotation and removal when the engine is running.

5. In a pressure responsive closure release of the character described, the combination of a container having an opening with a closure member adapted to be secured thereupon by rotation, a detent mounted at said opening to prevent a turning and removal of said closure means from said opening, a pressure responsive bellows mounted at one side of said container opening and connected to said detent for moving said detent into an inoperative position, a connection between the interior of said bellows and a source of subatmospheric pressure, and a spring seated centrally within said pressure responsive bellows adapted to extend same and move said detent in an operative position when the subatmospheric pressure within said bellows is insufficient to overcome the action of said spring.

BENJAMIN B. RANDRUP.